(12) United States Patent
Brunsell

(10) Patent No.: US 6,755,977 B2
(45) Date of Patent: Jun. 29, 2004

(54) METHOD IN TREATING AQUEOUS WASTE FEEDSTREAM FOR IMPROVING THE FLUX RATES, CLEANING AND THE USEFUL LIFE OF FILTER MEDIA

(76) Inventor: Dennis A. Brunsell, 2680 Westcott Blvd., Knoxville, TN (US) 37931

(*) Notice: Subject to any disclaimer, the term of this patent is extended or adjusted under 35 U.S.C. 154(b) by 138 days.

(21) Appl. No.: 10/176,428

(22) Filed: Jun. 19, 2002

(65) Prior Publication Data

US 2003/0234225 A1 Dec. 25, 2003

(51) Int. Cl.⁷ .................... C02F 1/78; B01D 65/06
(52) U.S. Cl. .............. 210/648; 210/760; 210/797; 210/808
(58) Field of Search ................ 210/746, 760, 210/797, 791, 805, 808, 648; 422/186.08

(56) References Cited

U.S. PATENT DOCUMENTS

| | | | |
|---|---|---|---|
| 4,595,498 A | | 6/1986 | Cohen et al. |
| 4,622,151 A | | 11/1986 | Hiltebrand et al. |
| 4,849,115 A | | 7/1989 | Cole et al. |
| 5,097,556 A | | 3/1992 | Engel et al. |
| 5,114,576 A | | 5/1992 | Ditzler et al. |
| 5,271,830 A | | 12/1993 | Faivre et al. |
| 5,348,664 A | * | 9/1994 | Kim et al. ........... 210/746 |
| 5,397,480 A | | 3/1995 | Dickerson |
| 5,593,598 A | * | 1/1997 | McGinness et al. ...... 210/748 |
| 5,645,727 A | | 7/1997 | Bhave et al. |
| 5,741,416 A | | 4/1998 | Tempest |
| 5,843,307 A | | 12/1998 | Faivre et al. |
| 6,001,247 A | | 12/1999 | Schulz |
| 6,074,564 A | | 6/2000 | Foellmi |
| 6,162,477 A | | 12/2000 | Crisinel et al. |
| 6,183,646 B1 | | 2/2001 | Williams et al. |
| 6,416,668 B1 | * | 7/2002 | Al-Samadi ........... 210/636 |

FOREIGN PATENT DOCUMENTS

| | | | |
|---|---|---|---|
| JP | 57194005 A | * | 11/1981 |
| JP | 04310220 A | * | 11/1992 |
| JP | 2001070764 A | * | 3/2001 |
| JP | 2001219165 A | * | 8/2001 |

OTHER PUBLICATIONS

Langlais, B.,et al.,(eds),1991, *Ozone In Water Treatment Application and Engineering*, pp. 190–203, Lewis Publishers: Chelsea, Michigan.

Droste,R.L., 1997, *Theory And Practice Of Water And Wastewater Treatment*, pp. 450–451 and 527–530, John Wiley & Sons: New York.

Mallevialle,J.,et al., 1992, *Influence and Removal of Organics in Drinking Water*, pp. 326–332, Lewis Publishers: Boca Raton.

Vigneswaren,D.,et al., *Water, Wastewater, and Sludge Filtration*, pp. 61–65, CRC Press, Inc.: Boca Raton, 1989.

Faust,S.D. and Aly,O.M., 1998, *Chemistry of Water Treatment*, pp. 292–298, Ann Arbor Press: Chelsea, Michigan.

* cited by examiner

*Primary Examiner*—Frank M. Lawrence
(74) *Attorney, Agent, or Firm*—M. Alex Brown, Esq., Patent Attorney

(57) ABSTRACT

A method in treating aqueous feedstream in diverse plant site environments is disclosed for improving filter flux rates, cleaning filter media and prolonging useful operative life of media. In preferred embodiments the method is provided with steps for contacting, reacting, pressurizing and equalizing ozone and feedstream within a central area or multiple areas and sustaining high pressure throughout the system to achieve qualitatively and quantitatively improved permeate products, and reject for recycle. The method and system provide an improved cleaning and processing system characterized by an ozone-concentrated, homogeneous single phase liquid conversion of a generated ozone gas mixture and a feedstream source containing organic and inorganic pollutants. The method improves and monitors ozone oxidizing power and reflecting ORP values, and provides further media cleaning and improved oxidation reactions for attack on pollutants on each cycle/recycle operation.

22 Claims, 6 Drawing Sheets

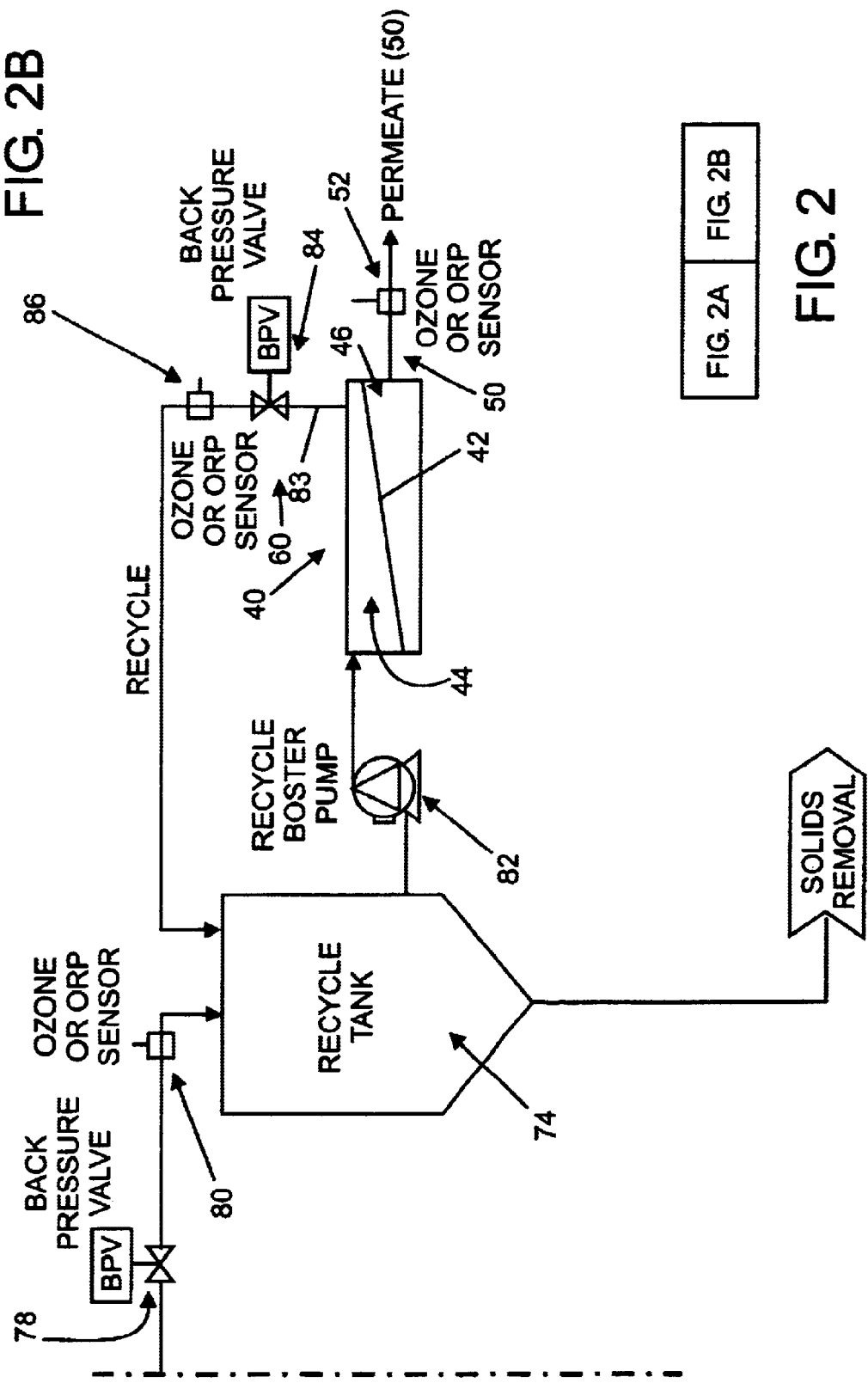

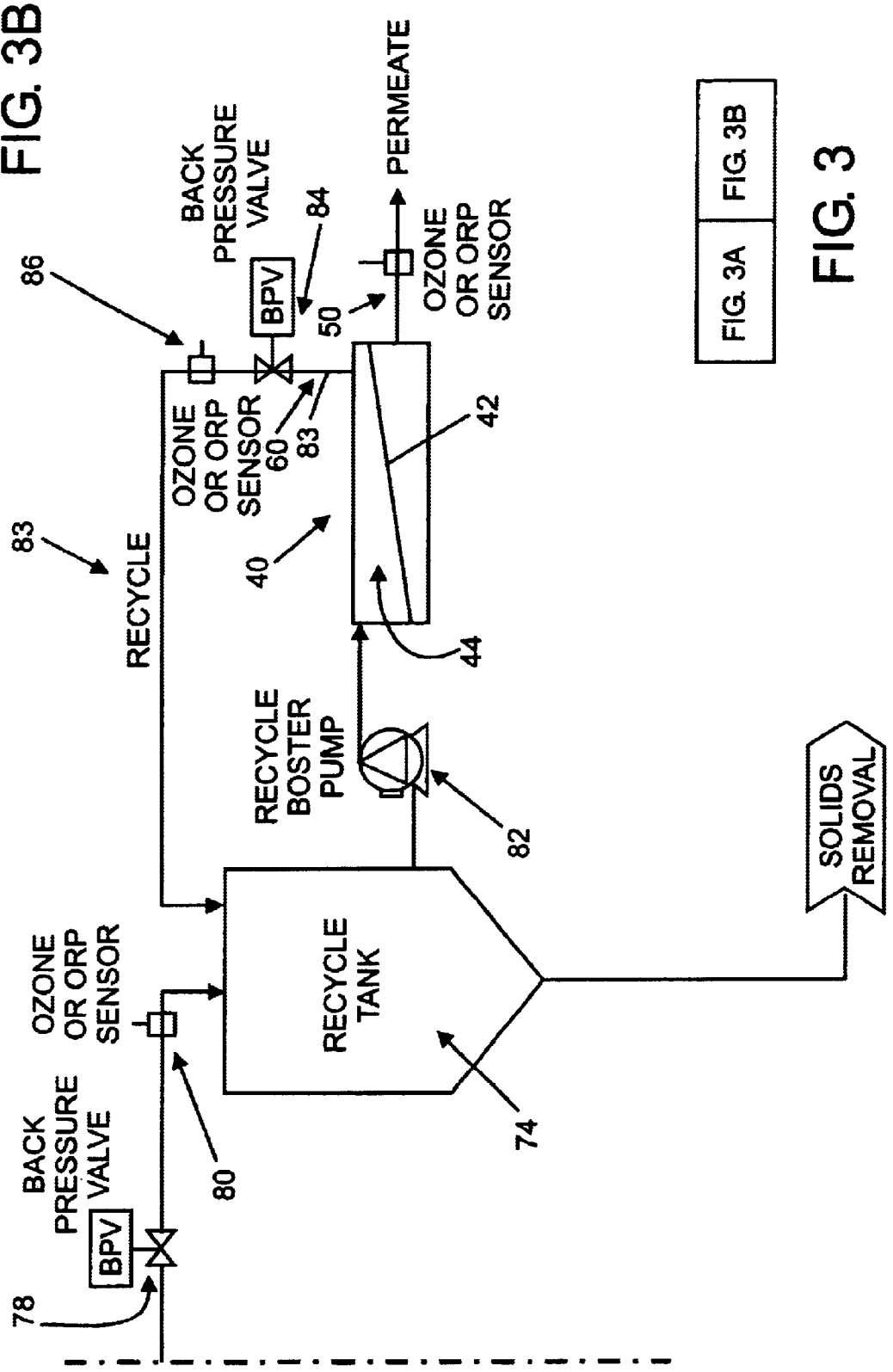

METHOD IN TREATING AQUEOUS WASTE FEEDSTREAM FOR IMPROVING THE FLUX RATES, CLEANING AND THE USEFUL LIFE OF FILTER MEDIA

BACKGROUND OF THE INVENTION

1. Field of the Invention

The present invention relates to the use of ozone to treat and process aqueous waste feedstream, especially as this would relate to treatment at filtration plant facilities; but also in other uses, where the concern or object exists to improve flux rates of feedstream through filter media and effectively change feedstream character so that it is presented in a condition where it will cause less wear or destruction of such media, and provide the added feature of effectively cleaning such filter media.

2. Background Information

It has been determined in the art that Ozone kills many biological agents by oxidizing the organic molecules that form the cell surface and in dealing with the problem of calcium buildup (a major portion of total dissolved solids—TDS), as well as dealing in the past with biocides used to chemically treat water systems.

Those references found which appear to have at least some relationship to the technology of ozone treatment and processing of environmentally significant aqueous waste feedstream include the fllowing: Williams, et al., U.S. Pat. No. 6,183,646; Crisinel, et al., U.S. Pat. No. 6,162,477; Foellmi, U.S. Pat. No. 6,074,564; Shultz, U.S. Pat. No. 6,001,247; Faivre, et al., U.S. Pat. Nos. 5,843,307 and 5,271,830; Busch, Jr., U.S. Pat. No. 5,807,486; Tempest, Jr., U.S. Pat. No. 5,741,416; Bhave, et al., U.S. Pat. No. 5,645,727; Dickerson, U.S. Pat. No. 5,397,480; Ditzler et al., U.S. Pat. No. 5,114,576; Engel et al., U.S. Pat. No. 5,097,556; Cole, et al., U.S. Pat. No. 4,849,115; Hiltebrand, et al., U.S. Pat. No. 4,622,151; Cohen, et al., U.S. Pat. No. 4,595,498; and Johnson, et al., U.S. Pat. No. 4,200,526.

Also having some relevance in terms of discussing some of the chemical principles involved in the present invention's technology (such as solubility aspects, pressure and the application of the Laws of Boyle, Charles, Dalton and Henry, and other chemical aspects), are the following references: (1) Various editions of *Lange's Handbook of Chemistry*, setting forth the "Solubility of Gases in Water," particularly as this relates to Oxygen and Air into Water or Water and Solvents; (2) Graik, et al., 2001, "The Effect of Ozone Gas-Liquid Contacting Conditions in a Static Mixer on Microorganism Reduction," *Ozone Science & Engineering*, Vol. 23, pp. 91–103; (3) Min Cho et al., 2001, "Effect of pH and Importance of Ozone initiated Radical Reactions In Inactivating *Bacillus subtilis* Spore," *Ozone Science & Engineering*, Vol. 24, pp. 145–150; (4) Mortimer, C. H., 1981, "The oxygen content of air-saturated fresh waters over ranges of temperature and atmospheric pressure of limnological interest," *International Association Of Theoretical And Applied Limnology*, pp. 1–23, E. Schweizerbart'sche Verlagsbuchhandlung: Stuttgart; (5) Langlais, et al. (eds.), 1991, *Ozone In Water Treatment Application and Engineering*, pp. 90–132, 349–442, 474–485, and 543–551; (6) Masschelein, W. J. (ed.), 1982, *Ozonization Manual for Water and Wastewater Treatment*, pp. 47–56, 69–102, 129–139, and 151–153, John Wiley & Sons: New York; (7) Gerrard, w\W., 1976, *Solubility Of Gases And Liquids*, pp. 1–276, Elsevier Scientific Publishing Company: New York; (9) Lide, D. R. (ed.), 1995–1996, "Vapor Pressure Of Fluids At Temperatures Below 300K—Ozone ($O_3$)", *CRC Handbook of Chemistry and Physics*, p. 6–71, CRC Press: New York; and (10) Linke, W. F., 1965, "$O_3$ Ozone Solubility In Water," *Solubilities Inorganic and Metal-Organic Compounds*, pp. 1239–1240, American Chemical Society: Washington, D.C.

The Faivre et al. '307 and '830 patent references would appear to be the closest potentially applicable prior art. The '307 reference is entitled: "Unit for the treatment of water by ozonation, and a corresponding installation for the production of ozonized water." The '830 reference is entitled: "Water treatment installation for a tangential filtration loop." These references teach a water treatment unit and installation designed expressly for the purpose of producing "ozonated white water," or water characterized by a multi-phase, non-homogeneous mixed system containing gaseous "bubbles" of ozone within the water, giving the water the appearance of turbulent 'white' water, and disclosed to have bubbles the size of between 20 and 200 microns, or larger in magnitude by virtue of the visibility to the naked eye of bubbled white water as described in Faivre.

The bubbles and white water of the Faivre teachings are designed to create physical turbulence in the water at the membrane, and employ the ability of ozone, in such a gaseous state, as an oxidation agent to further restrict clogging of their tangential filtration membrane. Such installations or units require a reduction in initial pumping pressure to form gaseous ozone bubbles, and a phase separation to prevent cavitation of pumping units and other equipment on line by virtue of Faivre's feedstream being at a point of supersaturation with the presence of potentially damaging gaseous bubbles; therefore, exposing such a system to the loss of useful ozone content, even in the form of the gas bubbles earlier created, as well as further time and expense in reinstating gaseous ozone bubble concentrations with regard to any recycling operations. The pressure in the Faivre installation must be dropped some 50% to 75% before reaching any filter unit to form Faivre's ozone gas bubbles. The unit or installation system of Faivre cannot sustain useful pressure throughout its system loop, from beginning to end, during any given cycle of its application or operation. This loss in pressure will decrease potential flow rate across tangential membranes along with significant reduction in turbulence. Nor can it recycle, as indicated, without losing its gaseous 'white water-bubbled ozone and starting from the beginning in re-generating its gaseous ozone bubbles or white water. These systems, therefore, lose their ability to effectively clean filter media because gaseous bubbled ozone, multi-phase fluid or suspension is submitted not to be an optimal form for effectively cleaning and saving wear on filter media. Nor is it effective and cost-saving in re-utilization through re-cycling because of the required reduction in pressure to form ozone bubbles and the phase separation required to protect against cavitation and other phase separation damage to pumps and other such equipment within Faivre's loop, or other equipment utilized on-line. This is born out by its relative or substantial obscurity of use in any environmental system employing filter media in the United States. Additionally, the teachings of Faivre would suggest, chemically, that its unit, installation or system, is sensitive to temperature and pH requirements because of the nature of its gaseous multi-phase mixture; thereby inherently involving greater potential for failure or demanding greater time and expense to maintain.

These and other disadvantages, structurally, functionally and by virtue of distinction in process and method approach, will become apparent in reviewing the remainder of the present specification, claims and drawings.

Accordingly, it is an object of the present invention to provide a substantially improved and cost-effective method in treating aqueous waste feedstream for improving the flux rates, cleaning and prolongation of useful life of filter media in many diverse environmental and process applications; with special adaptability and advantageous application to aqueous feedstreams from nuclear plant sites.

It is a further object of the present invention to provide a method which utilizes the solublizing (or the making soluble and uniform) of an ozone mixture (provided as having at least $O_3$ and $O_2$) and an aqueous feedstream to create a substantially homogeneous single phase liquid mixture or a substantially homogeneous molecular single phase mixture, without 'white water' or ozone bubbles; so that the ozone mixture generated within the present process and the aqueous feedstream to which it is applied are dissolved and miscible, one with the other, at a level below the saturation point of the generated ozone mixture (rather that at point of supersaturation); thus making it a more active and concentrated ozone solution system (with greater oxidizing power and cleaning ability).

It is yet a further object to provide a system and process of dissolving and solublizing ozone in an aqueous feedstream to produce a substantially single phase liquid system which will not damage filter media, pumps and like units on-line; and which can be maintained at a desired or higher pressure throughout the system on-line, from the beginning to the end of a complete given cycle, for maximizing the positive effect of the concentrated active oxidation or oxidizing power of such a single phase liquid system on a filter media; through enhanced cleaning, improved flux rates, improved quality and volume amount of effluent permeate, and the ability to recycle reject volumes for further cleaning and oxidation exposure without having to lower the pressure on-line.

It is a further object of the present invention to provide a solublized ozoneaqueous feedstream system which will have greater ozone concentration and oxidation activity at the surfaces of filter membranes or other filter media surfacing, for improved cleaning and prolonged useful life; while also serving functionally to cost-effectively facilitate greater amounts of permeate, faster re-cycling rates and greater volume movement potential throughout the system in relation to time.

It is yet a further object of the present invention to provide a method and system which will operate well at various pH and temperature ranges or ambient conditions at a given site.

It is an additional object of the present invention to sustain a workable higher pressure above atmospheric pressure throughout the on-line system and installation constituted in accordance with the present intention, to achieve the most optimal concentration and resulting activity of ozone in solution with an aqueous feedstream so that the full advantages of utilizing ozone to clean and prolong the life of otherwise expensive filter media are realized in that:

(1) Since ozone is generated by an electrical discharge into oxygen (supplied as plant air), no handling of hazardous chemical is required, with a flip of a switch beginning ozone production;

(2) Ozone has a much higher oxidation potential than hypochlorite (free chlorine) or hydrogen peroxide, which means that it reacts faster and attacks organics at a much higher rate;

(3) Ozone decomposes to oxygen, so no chemical contaminants (e.g., sodium chloride or chloramines) will affect downstream ion exchange performance or capacity;

(4) Ozone has a half-life of approximately 20 to 30 minutes, so there is no credible scenario for it to be found in plant effluent; and (5) Ozone dissolved in water is less aggressive to Tubular Ultra Filtration, Cross-Flow Membrane Media or other filtration means or units than hypochlorite or like chemicals or substances. Therefore, the use of ozone can enhance membrane life and reduce membrane fouling and frequency of cleaning, while maintaining a higher flux rate.

It will, therefore, be understood that substantial and distinguishable process and functional advantages are realized in the present invention over the prior art; and that the present invention's efficiency and adaptability of operation, diverse utility, and broad functional applications serve as important bases of novelty and distinction in this regard.

SUMMARY OF THE INVENTION

The foregoing and other objects of the invention can be achieved with the present invention, method, process and system which is a method and system for processing organic pollutants, and inorganic foulants in a reduced oxidative state, of an aqueous feedstream, for increasing flux rates across a filtration membrane, and for cleaning and prolonging the useful life of filtration and filter membrane installations.

The method and system of the present invention is provided with step (a) which includes: directing, channeling and pumping an aqueous feedstream having waste contaminants, from a feed water area to a reactor area for contacting, reacting, pressurizing and equalizing the aqueous feedstream, and concentrating solids and removing solids from the aqueous feedstream.

The method is further provided with step (b): generating an ozone mixture having at least $O_3$ and $O_2$, dissolving the ozone mixture into the aqueous feedstream under a pressure gradient having an alpha pressure, contacting the aqueous feedstream with the ozone mixture such that the aqueous feedstream is exposed for increased reaction of the ozone and concentrating and collecting solids at a bottom portion of the processing area.

Step (c) of the present invention includes: directing the aqueous feedstream from the reactor area and measuring ozone activity of the aqueous feedstream.

Step (d) includes: conveying the aqueous feedstream to a pumping area.

Step (e) comprises: pumping the aqueous feedstream to a filtration area having filter media, an inflow portion subarea and an outflow portion subarea, respectively, before and after the filter media.

Step (f) of the present method and system of the invention includes: marshaling an effluent portion volume of the aqueous feedstream passing through the filter media of the filtration area to the outflow portion subarea, and advancing and measuring ozone activity of the effluent portion volume, and the volume and amount of the effluent portion volume; and Step (g): advancing the effluent portion to a preselected site.

REFERENCE NUMBERS

Figure 1:
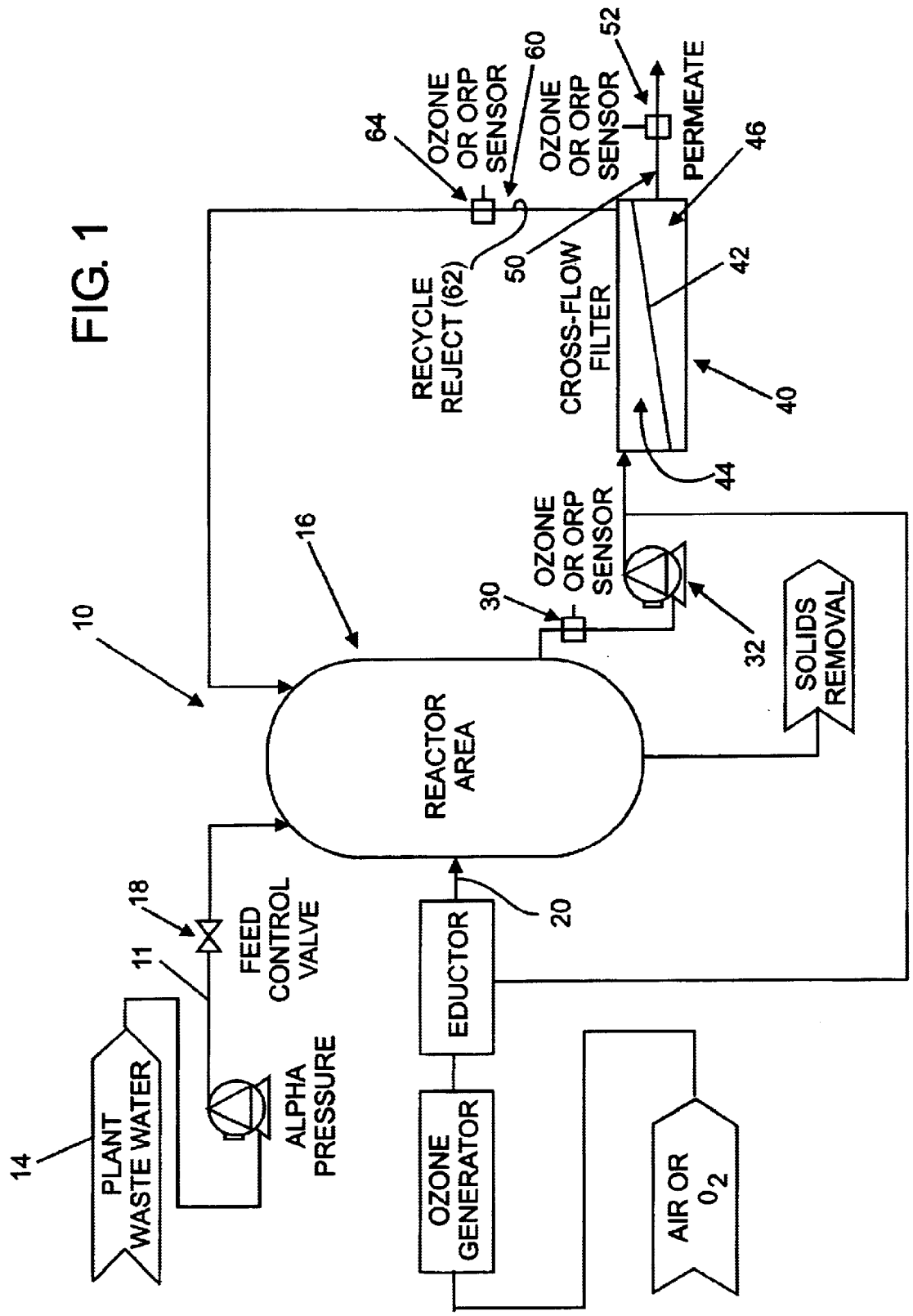
FIG. 1 is an exemplar flow diagram and schematic illustration of a preferred embodiment of the novel and substantially improved method in treating aqueous waste feedstream for improving the flux rates, cleaning and useful life of filter media of the present invention.

10 Ozone Method (Present Method System or Installation)
11 aqueous waste feedstream (or aqueous feedstream from 14)
14 plant or site waste water source area
16 Reactor Area
18 feed control valve (or equalizer volume-amount valve or tank equalizer)
20 $O_3/O_2$ mixture (ozone mixture)
alpha pressure at which feedstream is pumped into Reactor Area (16) and Reactor (72) in preferred embodiments of the invention
16A temporary or intermediary upper area of (16) (FIG. 4)
16B temporary or intermediary lower area of (16) (FIG. 4)
16C top portion of (16) (FIG. 5)
16D lower portion (16) (FIG. 5)
30 sensor area
32 pumping area
40 filtration area
42 filter media (filter membrane)
44 inflow side portion subarea
46 outflow side portion subarea
50 effluent permeate portion volume
52 sensor area
60 reject portion volume
62 recycle line (recycle reject line)
64 sensor area
70 dissolving area
72 Reactor (another preferred embodiment)(FIGS. 2 and 3)
74 Recycle Tank (FIGS. 2 and 3)
76 ORP sensor
78 back pressure valve (BPV)
80 ozone or ORP sensor
82 Recycle booster pump
83 recycle line
84 further back pressure valve
86 further ozone or ORP sensor

DETAILED DESCRIPTION OF THE PREFERRED EMBODIMENTS OF THE INVENTION

The following description of the preferred embodiments of the concepts and teaching of the present invention is made in reference to the accompanying drawing figures which constitute illustrated schematic examples of the methodical, systematic and functional elements of the present invention, among many other examples existing within the scope and spirit of the invention.

Referring now to the drawings, FIGS. 1, 2 and 3, thereof, there is diagrammatically illustrated an ozone method, process, installation and system in treating aqueous waste feedstream for improving the flux rates, cleaning and the prolongation of the useful life of filter membrane units and filter media 10, of the present invention; referred to hereinafter as the Ozone Method (or Present Method or System) 10.

The Ozone Method 10 is utilized for environmentally processing organic pollutants and inorganic pollutants (or foulants) having or characterized chemically by a reduced oxidative state, which are part (or part and parcel) of an aqueous waste feedstream associated with a manufacturing, plant, nuclear plant site or other facility producing aqueous waste.

The Present Method 10 is utilized to increase flux rates across a filtration membrane (or filter media), for cleaning such a membrane or media; and for prolonging and extending the useful operative life of such filter media. These useful applications apply to many diverse types of filter media, and have been found to work well with cross-flow filter media and tubular membrane media, over a wide range of pH values and temperatures (with 50 to 140 degrees F. being preferred when ambient conditions permit).

Figure 4:
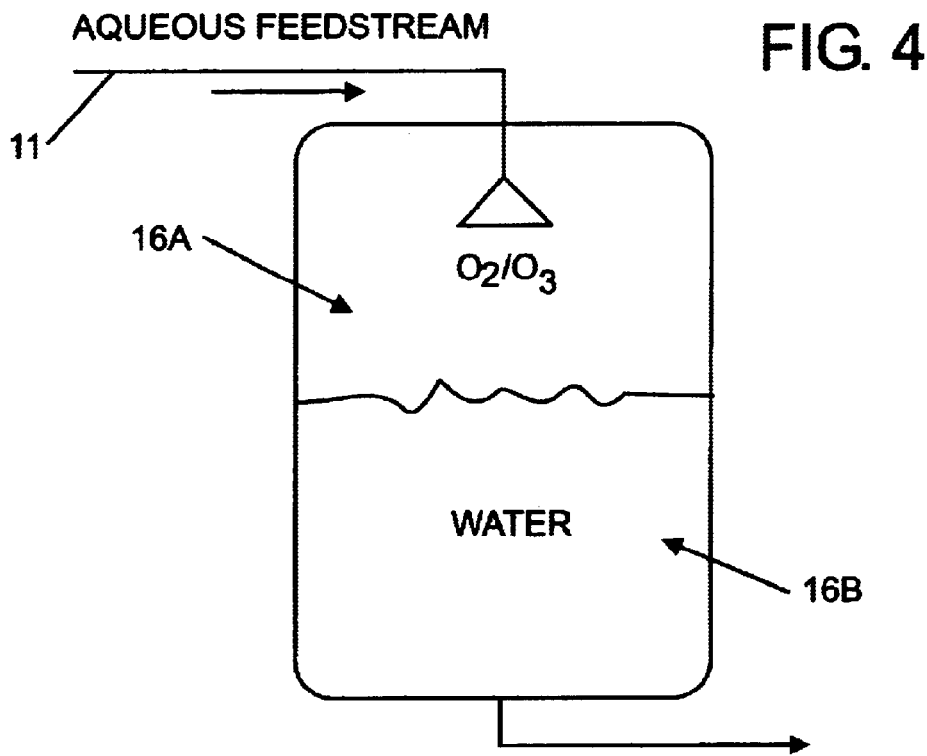
FIG. 4 is an exemplar schematic diagram illustrating one of the preferred embodiments of the Reactor Area of the embodiment of the present invention illustrated in FIG. 1.
Figure 5:
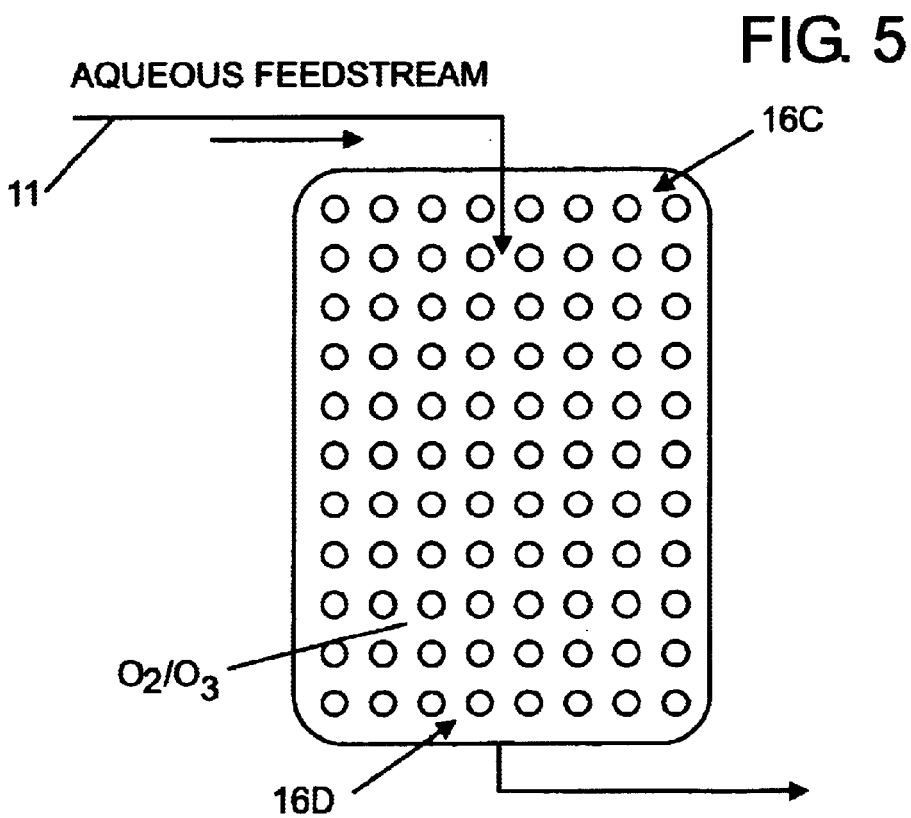
FIG. 5 is an exemplar schematic, diagrammatic illustration of another preferred embodiment of the Reactor Area utilized in the embodiment of the present invention illustrated in FIG. 1.

The Ozone Method 10 is provided with the initiating step of directing, channeling and pumping an aqueous waste feedstream, shown generally at 11 (and as a line passing through the present system), having waste contaminants from a plant or site waste water source area 14 associated with a plant or other facility; to a Reactor Area 16, shown by example in FIGS. 1, 4 and 5. Additionally, the site waste water source area 14 can, in fact, be any body of aqueous liquid or fluid which is the subject or target of cleaning, purifying or a filtration process. Many aqueous food liquids, solutions or fluids such as juice, soups and other foods could be included, as well as any aqueous body to be cleaned. The Reactor Area 16 is utilized in the method and system of the present invention and installation for the purpose of contacting, reacting, pressurizing and equalizing (on re-cycle) the aqueous feedstream 11 passing through the Present System 10; and for concentrating solids within the aqueous feedstream 11. The feedstream 11 is diagrammatically illustrated as passing through the illustrated method and system diagram or flow chart, and will be understood by those skilled in the art. The Reactor 16 is provided as a tank, vessel, container, receptacle or reservoir which can function with pressures above 2000 PSIG. (pounds per square inch, gauge, versus absolute pressure, also shown herein by the designation "p.s.i.g.") in magnitude.

The aqueous feedstream 11 is taken from a plant waste water site 16 and pumped at a pressure (referred to herein as the alpha pressure) of from about 10 to about 150 PSIG (or higher), or a preferred range of from about 30 to 50 PSIG (depending on the qualitative and quantitative nature of the feedstream 11) to a feed control (or equalizer-volume-amount tank) valve 18 (or gauge); and then to the Reactor 16. It will be understood within the scope and spirit of the present invention that the valve or gauge 18 can be positioned or installed with a positional orientation outside of, within and/or adjacent or beside the Reactor 16. The use of much higher alpha pressures of 100 PSIG to 2000 PSIG can be employed, as indicated, with regard to, and use of, some of the newer filter media becoming available in this technology.

The valve 18 is utilized initially to meter, measure or quantitate a selected or preselected volume or amount of aqueous feedstream 11; and will generally (depending on the site) have a starting amount of, for example, about 300 to 400 gallons (or equivalent volume) of feedstream 11. It will be understood within the scope of the present invention that this volume or amount can also be less or considerably more. This amount of aqueous feedstream 11 will, therefore, be directed, channeled, piped or otherwise conveyed, at the alpha pressure (or under the alpha pressure gradient), and at this higher pressure above atmospheric pressure, into the Reactor Area 16. It will be understood that one (1) atmosphere of pressure (760 mmHg., 1.103 bar) is equal to about 14.70 lbs. per square inch (p.s.i).

The valve 18 is further utilized after a cycle in the present system 10 is completed, as further described below, to meter or add in an amount or volume of additional feedstream 11 from the plant waste water source area 14 equal or equivalent in volume or amount to the volume or amount extracted at the end of a given cycle as effluent permeate, later described herein; therefore restoring the feedstream (or recycled remaining feedstream) to its original starting amount or volume (as indicated by example earlier as, for example, 300–400 gallons, but which will vary in accordance with starting conditions).

A mixture containing at least $O_3$ and $O_2$ (ozone and diatomic oxygen, recognizing that molecular oxygen is $O_2$ and ozone is $O_3$) is generated by an ozone generator utilizing air or an $O_2$ source (such as an oxygen separator); and the $O_3/O_2$ mixture 20 is educted, causing a partial vacuum and thus drawing the $O_3/O_2$ mixture 20 into the Reactor Area 16. It will be understood within the scope of the invention that the mixture 20 can otherwise be generated, conveyed and supplied to the Reactor 16. Many ozone generators are available on the market which can be utilized in this part of the process. An example, of many such generators which are employable or adaptable for use, includes the Model 1250 Ozone Generator made by CEC, 2749 Curtiss Street, Downers Grove, Ill. 60615. Many other types and models of ozone generators, and other equipment creating, forming or generating ozone mixtures 20 can be utilized satisfactorily within the present method and system installation 10.

Examples, without limitation, of ozone generator use parameters include the following specification: Design Pressure: 150 PSIG; Design Temp: 150 degrees F.; Design Feed Stock: Radioactive Waste Water; Designed TOC Destruction Rate: 300 ppm-gpm; Hydrostatic Test Pressures: 1.5× Design Pressure; Maximum Allowable Feed Pressure: 150 PSIG; Typical Feed Pressure 50 to 100 PSIG; Maximum Allowable Operating Pressure: 50 PSIG; Nominal Operating Pressure 30 to 45 PSIG; Max. Allowable Operating Effluent Press.: 50 PSIG; Nominal Operating Effluent Press.: 30 to 45 PSIG; Max. Allow. Operating Temp.: 140 degrees F.; Min. Allow. Oper. Temp.: 32 degrees F.; Nominal Oper. Temp.: 50 to 104 degrees F.; Nom. CIP Oper. Temp.: 60 to 135 degrees F.; Peak Flow Rate: 50 GPM; Typical Flow Rate 15 to 40 GPM; and Min. Flow Rate: 5 GPM.

The feedstream 11 is, therefore, pumped into the Reactor 16 at the alpha pressure, for example between 30 to 50 PSIG (or higher), and the ozone mixture 20 is generated and provided to the Reactor 16 and dissolved into the aqueous feedstream 11 so that the mixture 20 is solublized (or made soluble) within and with the aqueous feedstream 11, to produce a substantially or generally homogeneous single phase liquid mixture, where the ozone mixture 20 in the aqueous feedstream is dissolved and miscible, one with the other, in a consistent liquid solution without the presence of bubbles or any white water created by ozone bubbles; and where the ozone mixture 20 is dissolved in the aqueous feedstream at a level below the saturation point of the ozone mixture 20. The elevated pressure of the Reactor 16, because of the alpha pressure that the feedstream is pumped in at, improves the rate and equilibrium of the solubility of the ozone mixture 20 and the feedstream 11 in the Reactor 16. It will also be understood within the scope of the invention that a pressure gradient can be brought to bare on, or established in, the Reactor 16 through means other than the pressure at which the feedstream 11 is pumped into the Reactor.

Additionally, within the Reactor Area 16, the aqueous feedstream 11, now containing and being dissolved with the ozone mixture 20 ($O_3$ and $O_2$), is exposed to physical surfacing or additional surface opportunities, so that further oxidation or oxidizing reaction can take place by virtue of the effect that the concentrated and dissolved ozone has on the ingredients and pollutants of the feedstream 11; and improved Ozonalysis can take place. Examples within the scope and spirit of the invention which set forth, in exemplar preferred embodiments how the contacting and additional surfacing opportunities can be achieved include those illustrated in FIGS. 4 and 5.

FIG. 4 illustrates a Reactor Area 16 where the aqueous feedstream 11 is provided to the Reactor 16 from piping or channeling which leads to a nozzle member 22 supported within the Reactor 16 for conveying and spraying the feedstream 11 to a temporary or intermediary upper area 16A within the Reactor 16 which initially contains the ozone mixture 20 provided to the Reactor 16. Initially, or during the initial stages or sequences of time during which the feedstream 11 and the ozone mixture 20 enter the Reactor 16, the feedstream 11, because of the initial effect of its density, will drop to the temporary or intermediary lower area 16B; contemporaneously or shortly followed by the effect of the alpha pressure gradient which is established in the Reactor 16, facilitating the mixing and solublizing earlier discussed. This permits greater contact, surface exposure and reaction potential; and, therefore, greater oxidizing opportunities, between the feedstream 11 and the ozone mixture 20.

Another example of accomplishing the contacting, mixing and reaction functions of the Reactor area 16 of the present invention is illustrated in FIG. 5. In this preferred embodiment the aqueous feedstream 11 is provided initially to a top portion 16C of the Reactor 16 so that it substantially or generally fills the area 16 (with some space left at the top as illustrated). The ozone mixture 20 is provided to a lower portion 16D (or spaced portion in relation to the position of the top surfacing of the feedstream or the space left where the area 16 is not completely filled), directly into the feedstream 11; and permitted initially (or in an intermediary sequence) because of the lower density of the gas, as initially provided, to rise through the body of the feedstream 11 from the area 16D to the top or upper portion, while or until the alpha pressure gradient has its effect in homogeneously solutionizing or solublizing the ozone mixture 20 within the feedstream 11. This embodiment of the present method 10 permits greater opportunity for surfacing (or providing or exposing more surface area) and contacting; and, therefore, provides more opportunities for further oxidation reactions between the ozone of the mixture 20 and the pollutants (organic and inorganic) of the aqueous feedstream 11 to occur. It will be understood within the scope of the present invention that other means of contacting and surfacing the mixture 20 and the feedstream 11 can be utilized, such as passing them over or through various columns or packed columns, etc., for exposing the feedstream 11 to further angles and surfaces of dissolving and reaction with the ozone contained in the ozone mixture 20.

Figure 2A:
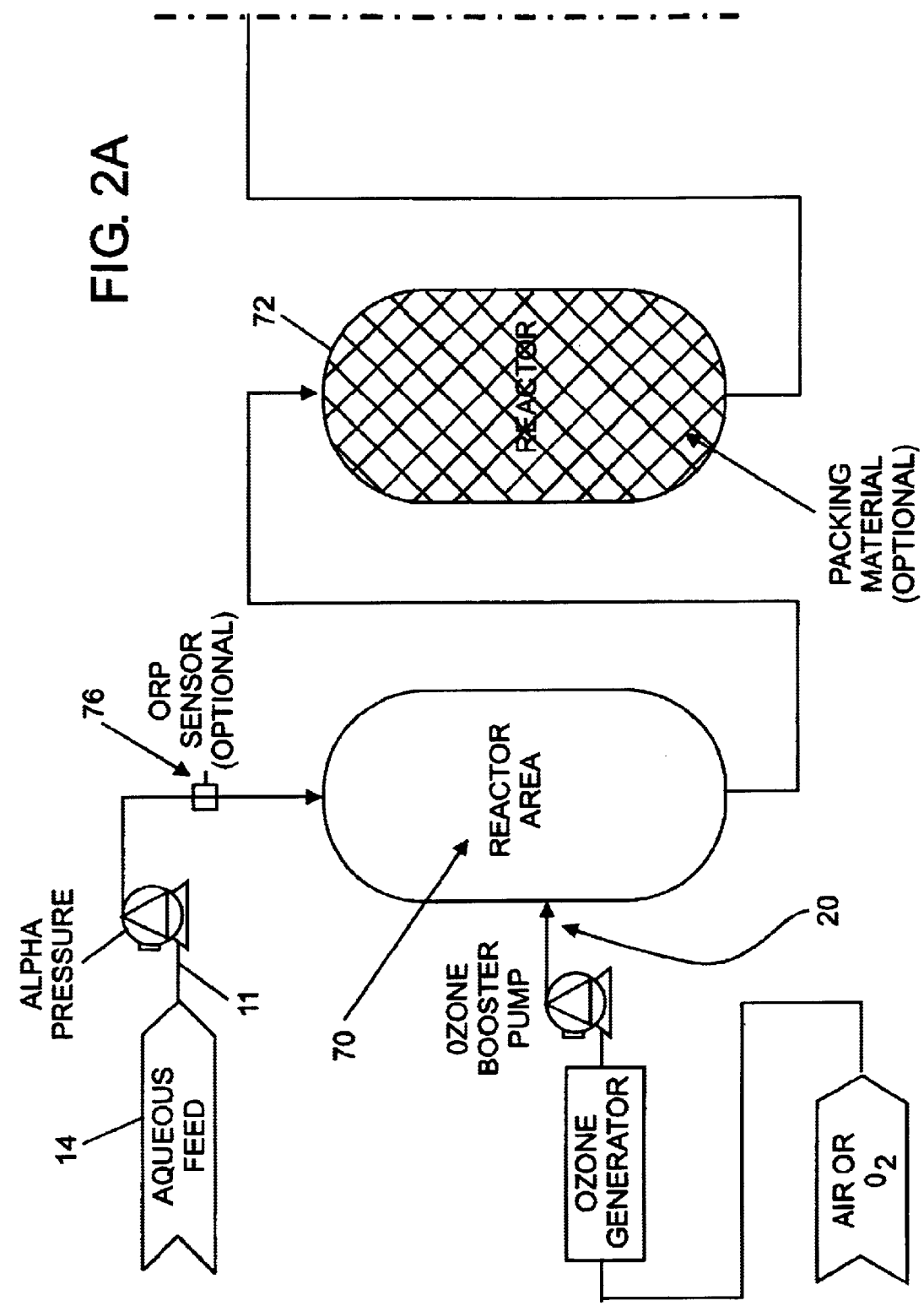
FIG. 2 is an exemplar flow diagram and schematic illustration of another preferred embodiment of the present invention.
Figure 3A:
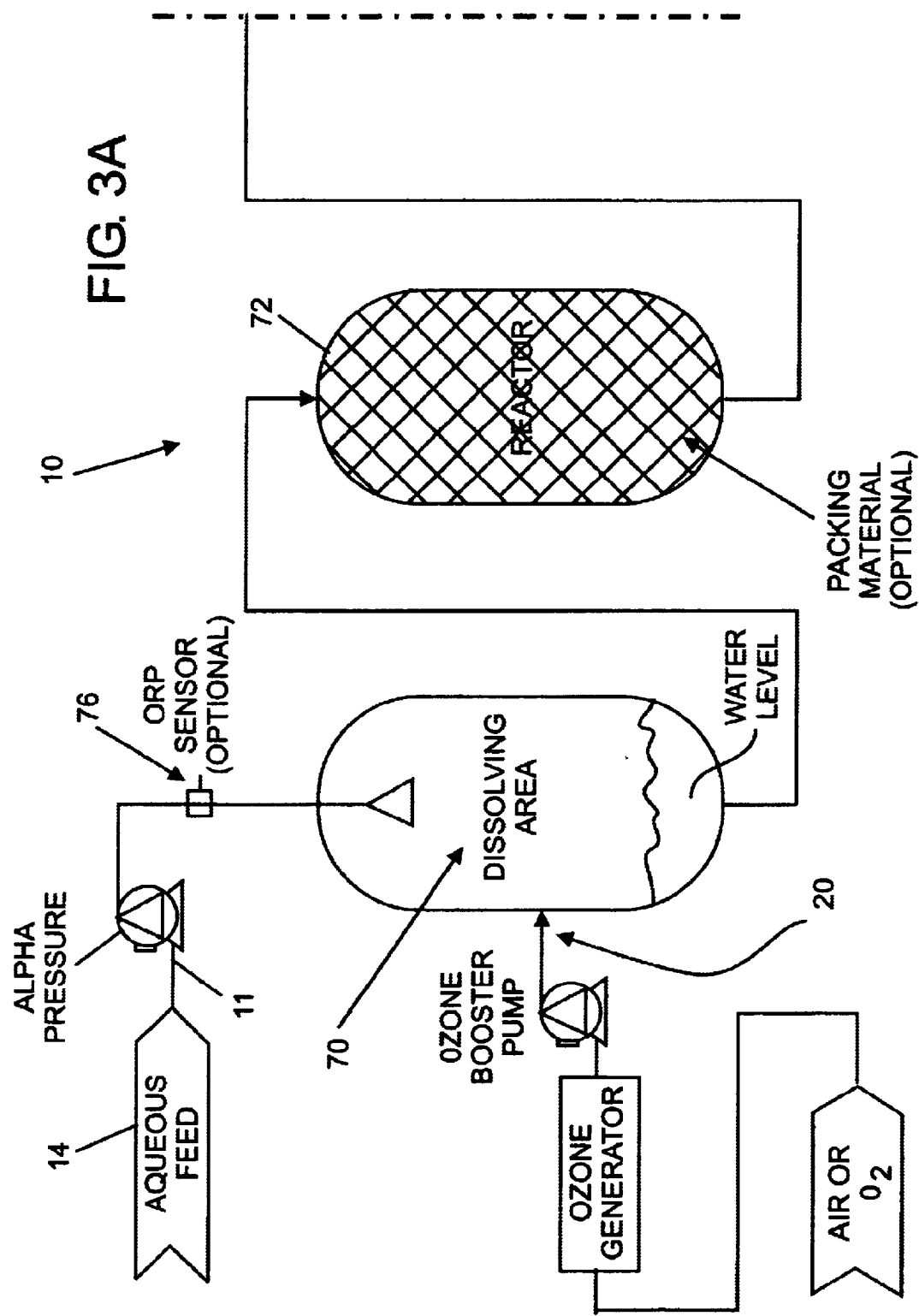
FIG. 3 is another exemplar schematic, diagrammatic illustration of an embodiment related to that illustrated in FIG. 2.

Also included within the activities and functions within the Reactor 16 of the present ozone method 10 is a concentrating and relegation (location or positional orientation) of solid substances (compounds or materials) to a bottom area of the Reactor 16 for removal during a preselected sequence of time during the operation or cycling of the method 10; as shown schematically, by example, in FIGS. 1, 2 and 3.

The present method 10 further includes directing the ozone dissolved, feedstream 11 from the Reactor Area 16, after the process discussed above, to a sensor area 30, where the ozone activity of the feedstream 11 is measured. This activity is commonly measured, within preferred embodiments of the invention, as an analysis of ozone content (such as by virtue of a titration indicator means) within the feedstream 11, or as an ORP (oxidation or oxygen reaction potential, or redox potential). For example, an ORP reading of +500 mV or above, indicates an extensive ozone oxidizing condition; one indicating a non-foulant (or non-polluted) state, character or feedstream condition. Positive values in this respect could run within a target range of from about +500 mV to about +1000 mV; with the solubility limit of ozone being characterized by a value of +1400 mV; and a condition where the feedstream had little or no ozone content being characterized by an ORP value of less than about +100 mV. It is, therefore, one important feature and novelty of the present method 10 that the ORP value is adjusted in a positive manner; to, therefore, indicate positive adjustment increase and substantially improved effectiveness of ozone concentration. Various ozone or ORP sensor areas (as illustrated by example in the drawings) are, therefore, provided along the on-line cycle of the present method and installation 10 to assure that this positive ozone concentration (and denoting positive ORP reading) is taking place; and to make positive adjustments (within a cycle or upon re-cycle) if this is not, for some reason, taking place.

In a preferred embodiment of the method 10, the data obtained in ORP units at the sensor 30 is utilized on recycle of the process to adjust the output or production of ozone concentration from an ozone generator utilized to an amount which will render the feedstream and dissolved ozone mixture leaving the Reactor Area 16 at an ORP value of from about 750 mV to about 800 mV.

The present method 10 further, then, includes conveying the feedstream 11 to a pumping area 32, and pumping the feedstream 11, while maintaining the alpha pressure, to a filtration area 40, characterized and illustrated herein as having the filter media 42 (or filter membrane), the inflow side portion subarea 44 and the outflow side portion subarea 46; as illustrated in FIGS. 1, 2 AND 3. And, as so characterized, the filter 42, the inflow side 44 and the outflow side 46 are positioned, respectively, in the middle (indicated by a diagonal line), in front of (or positioned before the middle), and behind (in back of, after or following) the middle of the filtration area 40, as illustrated.

It will be understood within the scope of the present method and installation 10 of the invention that a number of different pumps can be utilized in the pumping area 32; and that the present invention is applicable to cleaning, improving the flux rate and prolonging the useful life (from 2 to 5 years longer) of various types of filtration units (illustrated schematically as the filtration area 40). For example, the method 10 is especially useful in relation to cross flow filtration and tubular system filtration units employed at manufacturing plant and nuclear waste site areas; but would be expected to improve the function, capacity and working time of any type of filtration or filter membrane system or other types of filter or cleaning systems utilized in relation to processing an aqueous waste feedstream.

An example of one such system with which the present method 10 can be used is the A19 Ultrafiltration System (PCI Membrane Systems 19 tubular UF/MF System) manufactured by PCI Membrane systems Limited, Laverstoke Mill, Whitchurch, Hampshire RG287NR, UK. Many other types of filter system or units including, but not limited to: Filters used for Radioactive liquids; disposable filters; reusable filters, precoat filters; septum filters; flatbed filters; centrifugal filters; metallic, non- or partially-cleanable filters; etched disk filters and miscellaneous filters (such as deep-bed filters clam shell, magnetic, sand filters, etc.); can be benefitted, or benefitted through adaptation, by the present method 10.

The present ozone method 10 further includes, in its installation on-line system, marshaling (gathering and/or conveying) an effluent permeate portion volume, shown generally at 50, from the feedstream 11 after it has passed (or as it is passing) through the filter media 42; designated in FIG. 1 as a permeate product; having been affected to do so by the constant alpha pressure and the oxidizing effect of the concentrated ozone in single phase solution with the feedstream 11. This permeate 50 passes through the filter media 42 to the outflow side portion subarea 46. The effluent permeate 50 is then advanced to another sensor area 52, where it is again measured for ozone activity, as discussed above. The resulting volume and amount of effluent permeate 50; expected to be from about 25% to about 30% of the original starting volume/amount of the aqueous feedstream 11 (given above, by example, as 300–400 gallons); is also measured at this time; or is measured contemporaneously in time in relation to recycling aspects of the present method 10 discussed herein. In this regard, as discussed above, the feed control valve 18 is utilized for the purpose of adding back an amount of new feedstream from the waste water 14 equivalent or equal to the volume or amount of the permeate 50 derived and taken from the system as a product, prior to starting a new cycle.

The effluent permeate 50 is then advanced to a selected or preselected site or location for storage, use or further conveyance.

The method 10 further includes marshaling of a reject portion volume, generally indicated as 60, consisting of that part, portion, amount or volume of the feedstream 11 not passing through the filter media 42 and being positioned, by virtue of that fact, at the inflow side portion subarea 44 of the filtration area 40; and advancing the reject 60 to a continuation of the system designated as a recycle line 62 (or recycle reject line).

The reject 60 is then conveyed to another sensor area 64 for measuring the ozone activity of the reject 60, as discussed above herein. The reject 60 is then channeled (conveyed or piped) back to the Reactor Area 16 or the feed control valve 18 just outside, within or a part of the Reactor Area 16, for metering, measuring and addition of further restoration volumes or amounts of site waste water 14 equal or equivalent to the amount of permeate portion volume 50 taken out of the system as indicated above; thus forming a new aqueous feedstream volume to be processed as indicated in a re-cycle mode of the present method 10, and taken through the same steps and process indicated above as a part of the Method 10, for the purpose of obtaining further permeate product 50 while further cleaning the filter media 42.

Another preferred embodiment of the present method 10 of the present invention is illustrated schematically in FIGS. 2 and 3. In this preferred embodiment of the ozone method 10 the same processes are carried out in accordance with the teachings of the present invention set forth above. However, in this embodiment, at least three (3) separate areas (such as tanks, vessels, containers, reservoirs or cylinders) are utilized to address the steps and parts of the present method 10.

In this respect, the Dissolving Area 70 is utilized to receive the aqueous feedstream 11, pumped in under the alpha pressure from the waste water area 14; and to mix and homogeneously dissolve the ozone mixture 20 generated and provided to the area 70 with the feedstream 11. The Reactor 72 is utilized to provide structure and/or positionally arranged surfacing to expose the feedstream 11 to greater or increased oxidation by the ozone mixture 20 dissolved in the feedstream 11. And the Recycle Tank 74 is utilized for concentrating any solids forming a part of the feedstream 11 and making them available for removal at a preselected time from the Tank 74 and system 10.

An ORP sensor 76 is located, by preselected option, between the waste water site 14 and the Dissolving Area 70. The Reactor 72 can be optionally provided with packing material or other content or positional orientations for providing greater surfacing potential for the feedstream 11 passing through it.

A back pressure valve (BPV) 78 and an ozone or ORP sensor 80 are provided on-line between the Reactor 72 and the Recycle Tank 74. The valve 78 is utilized to maintain alpha pressure; and the sensor 80 is utilized as indicated to measure ozone activity.

A Recycle Booster Pump 82 is provided between the Recycle Tank 74 and the filtration area 40 for maintaining pressure and conveying the feedstream through the filtration area 40, so that the reject volume portions 60 are channeled to the recycle line 83 and the permeate portions 50 are pumped through the filtration area 40 and out of the system.

A further back pressure valve 84 and ozone or ORP sensor 86 are provided on the recycle line 83. The recycle line 83 takes the reject portion 60 back to the Recycle Tank 74 for further processing as indicated in the original step and shown by schematic flow-chart illustrated representation in FIGS. 2 and 3.

Accordingly, the appended claims are intended to cover all changes, modifications and alternative options and embodiments falling with the true breath, scope and spirit of the present invention. The reader is, therefore, requested to determine the scope of the invention by the appended claims and their legal equivalents, and not by the examples which have been given.

I claim:

1. A method for processing organic pollutants, and inorganic foulants in a reduced oxidative state, of an aqueous feedstream, increasing flux rates across a filtration membrane, and cleaning and prolonging the useful life of filtration and filter membrane installations, said method and system comprising:
   (a) directing, channeling and pumping an aqueous feedstream having contaminants, from a feed water area to a reactor area for contacting, reacting, pressurizing and equalizing the aqueous feedstream, and concentrating solids and removing solids from the aqueous feedstream;
   (b) generating an ozone mixture having at least $O_3$ and $O_2$, dissolving the ozone mixture into the aqueous feedstream under a pressure gradient having an alpha pressure, contacting the aqueous feedstream with the ozone mixture such that the aqueous feedstream is exposed for increased reaction of the ozone and concentrating and collecting solids at a bottom portion of said processing area;
   (c) directing the aqueous feedstream from the reactor area and measuring ozone activity of the aqueous feedstream;
   (d) conveying the aqueous feedstream to a pumping area;
   (e) pumping the aqueous feedstream to a filtration area having a filter media, an inflow portion subarea and an outflow portion subarea, respectively, before and after the filter media;
   (f) marshaling an effluent portion volume of the aqueous feedstream passing through the filter media of the filtration area to the outflow portion subarea, and advancing and measuring ozone activity of the effluent portion volume, and the volume and amount of the effluent portion volume;
   (g) advancing the effluent portion to a preselected site.

2. The method of claim 1, wherein, after step (e):
   (e)(1) marshaling a reject portion volume of the aqueous feedstream not passing through the filter media, and proximal to the inflow portion subarea of the filtration area and advancing the reject portion volume to a recycle line.

3. The method of claim 2, wherein, after advancing the reject portion volume to a recycle line:
   (e)(2) measuring ozone activity of the reject portion volume.

4. The method of claim 3, further comprising:
   (e)(3) channeling the reject portion volume to the reactor area, and adding a further aqueous feedstream volume form the feed water area equal in volume and amount to that of the effluent portion volume, thereby, forming a new aqueous feedstream volume.

5. The method of claim 4, wherein, after step (e)(3):
   recycling the new aqueous feedstream volume through steps (b), (c), (d), (e), (f) and (g); and steps (e)(1), (e)(2) and (e)(3).

6. The method of claim 2, wherein the alpha pressure is equal to from about 10 p.s.i.g. to about 150 p.s.i.g.

7. The method of claim 6, wherein, in the generating of step (b) the ozone mixture is provided by an ozone generator at an output of from about 1 p.s.i.g. to about 150 p.s.i.g.

8. The method of claim 6, wherein step (b) further comprises supplying the aqueous feedstream to an area over water where the ozone mixture is generated and interfaced with the alpha pressure being equal to from about 30 p.s.i.g. to about 50 p.s.i.g.

9. The method of claim 6, wherein, in step (b), the alpha pressure is equal to from about 100 p.s.i.g. to about 2000 p.s.i.g.

10. The method of claim 6, wherein, step (b) further comprises channeling the aqueous feedstream to a positioned area having an upper level surfacing, under the alpha pressure, and generating the ozone mixture at a positioning relative to the aqueous feedstream such that it passes throughout the aqueous feedstream to the upper level surfacing.

11. The method of claim 6, wherein, dissolving the ozone mixture into the aqueous feedstream under the pressure gradient having the alpha pressure, comprises solublizing the ozone mixture and the aqueous feedstream such that a substantially homogeneous single phase liquid mixture is formed whereby the ozone mixture and the aqueous feedstream are dissolved and miscible, one with the other, at a level below the saturation point of the ozone mixture.

12. A process for removing and destroying organic foulants and inorganic foulants in a reduced oxidative state, applied in utilization upstream of filtration membranes, for increasing flux rates and prolonging the useful life of filter membranes, said process and system comprising:
   (a) directing and channeling an aqueous feedstream from a site waste water area to a dissolving area;
   (b) generating an ozone mixture having at least $O_3$ and $O_2$, and dissolving the mixture into the aqueous feedstream under a pressure gradient having an alpha pressure, such that the mixture having at least $O_3$ and $O_2$ is dissolved and miscible within the aqueous feedstream at a level below saturation point and the ozone mixture and the aqueous feedstream are solublized to produce a substantially homogeneous single phase mixture;

(c) channeling the aqueous feedstream to a contact-surfacing enhancement area;

(d) contacting and surfacing the aqueous feedstream by slowing the aqueous feedstream and providing additional surface area for the occurrence of further oxidation reactions and destruction of organic and other substances detrimental to filter membranes;

(e) directing the aqueous feedstream from the contact-surfacing enhancement area and measuring ozone activity of the aqueous feedstream;

(f) conveying the aqueous feedstream to a back pressure valve and maintaining pressure;

(g) transporting the aqueous feedstream to a recycle tank area, and concentrating and collecting solids at a bottom portion thereof;

(h) moving the aqueous feedstream into a pumping area;

(i) repressurizing the aqueous feedstream to the alpha pressure and pumping the aqueous feedstream to a filter membrane area having a filter media, an inflow portion and an outflow portion, respectively, in front of and beyond the filter media;

(j) marshaling an effluent portion of the aqueous feedstream passing through the filter membrane area to the outflow portion and advancing and measuring the effluent portion for ozone activity and volume amount; and (k) advancing the effluent portion to a preselected site.

13. The process of claim 12, wherein, after step (i):

marshaling a reject portion of the aqueous feedstream not passing through the filter, proximal to the inflow portion of the filter membrane area, and advancing the reject portion to a recycle line.

14. The process of claim 13,
wherein:
after advancing the reject portion to a recycle line, measuring ozone activity and volume amount, and directing the reject portion back to the recycle tank area of step (g).

15. The process of claim 14,
wherein, at selected time sequences, cleaning the recycle tank area and evacuating solids and like fluid substances from the bottom portion of the recycle tank area, and transporting the solids and like fluid substances to the site waste water area.

16. The process of claim 12,
wherein:
the alpha pressure is equal to from about 10 p.s.i.g. to about 150 p.s.i.g.

17. The process of claim 16,
wherein:
the alpha pressure is equal to from about 30 p.s.i.g. to about 50 p.s.i.g.

18. The process of claim 12,
wherein:
the alpha pressure is equal to from about 100 p.s.i.g. to about 2000 p.s.i.g.

19. The process of claim 16, wherein, in the generating of step (b), the ozone mixture is provided by an ozone generator at an output of at least from about 1 p.s.i.g. to about 150 p.s.i.g.

20. The process of claim 12, wherein, after step (b) and before step (c):

channeling the aqueous feedstream and measuring ozone activity of the aqueous feedstream.

21. The process of claim 12,
wherein:
the dissolving of step (b) further comprises exposing the aqueous feedstream to water-leveling by virtue of a water level means, for preventing the ozone mixture from leaving the aqueous feedstream.

22. The method of claim 5,
wherein:
an ORP data result in mV units is obtained from the step (c), and utilized on the recycling of the new aqueous feedstream volume, so as to adjust the generating of step (b) to a rate of ozone output where the aqueous feedstream in step (b) in the recycling of the new aqueous feedstream volume is from about 750 mV. to about 800 mV.

* * * * *